United States Patent [19]

Funahashi

[11] Patent Number: 5,309,297
[45] Date of Patent: May 3, 1994

[54] DIGITAL CASSETTE TAPE REPRODUCING DEVICE INCLUDING NOVEL DRIVE CIRCUIT

[75] Inventor: Hiroyuki Funahashi, Kyoto, Japan

[73] Assignee: Rohm Co., Ltd., Kyoto, Japan

[21] Appl. No.: 960,796

[22] Filed: Oct. 14, 1992

[30] Foreign Application Priority Data

Oct. 16, 1991 [JP] Japan ................... 3-296480

[51] Int. Cl.⁵ .............. G11B 5/02; G11B 15/12; H03G 5/00
[52] U.S. Cl. .................... 360/67; 360/61; 381/107
[58] Field of Search .......... 360/68, 67, 51, 61, 360/15, 10.1, 72.2, 30, 27, 14.2, 60, 65, 40, 32; 330/130; 381/104, 107, 120, 121, 123, 81, 101, 102

[56] References Cited

U.S. PATENT DOCUMENTS

| | | | |
|---|---|---|---|
| 4,223,273 | 9/1980 | Yokogama | 381/121 X |
| 4,363,001 | 12/1982 | Suzuki et al. | 381/101 X |
| 4,773,096 | 9/1988 | Kirn | 381/120 |
| 5,218,643 | 6/1993 | Nagashima | 381/102 X |

Primary Examiner—Donald Hajec
Assistant Examiner—Patrick Wamsley
Attorney, Agent, or Firm—Fay, Sharpe, Beall, Fagan, Minnich & McKee

[57] ABSTRACT

A power amplifier of a digital cassette tape reproducing device is set to a value suitable to amplify an amplitude level of an audio signal from an analog signal reproducing system thereof and, when a digital signal reproducing system is selected, an audio signal therefrom is supplied to the power amplifier circuit without attenuation while increasing an amount of negative feedback of the power amplifier circuit, hence reducing amplification thereof to match an output level of the power amplifier circuit with that of the analog signal reproducing system to thereby improve S/N ratio and maintain high tone quality of the digital source.

9 Claims, 3 Drawing Sheets

DIGITAL CASSETTE TAPE REPRODUCING DEVICE INCLUDING NOVEL DRIVE CIRCUIT

BACKGROUND OF THE INVENTION

The present invention relates to a digital cassette tape reproducing device and, particularly, to an improvement of a digital compact cassette tape reproducing device having a digital signal reproducing function of reproducing a digital audio signal recorded on a magnetic tape and an analog signal reproducing function of reproducing an analog audio signal recorded on a magnetic tape. The invention further relates to such a compact cassette tape reproducing device having a function of recording a digital and an analog audio signal on magnetic tapes in addition to the reproducing functions, while improving tone quality of a reproduced audio signal.

A compact disc (CD) of 12 cm size has become popular as a recording medium for digital audio signals and, in order to reproduce such digital audio signals therefrom, a digital cassette tape reproducing device has been used in various audio devices such as, for example, a CD radio cassette recorder, a CD stereo component device and a car-mounted audio device.

On the other hand, in order to digitally record an audio signal on a magnetic tape and reproduce it therefrom, the so-called DAT standard has been proposed and used practically to some extent. However, a DAT recording/reproducing device has not become popular so far.

The so-called digital compact cassette tape recorder in which an audio signal is digitally recorded on a conventional cassette tape for analog recording has been proposed besides the above-mentioned techniques. Such a digital compact cassette tape recorder (referred to as a DCC player, hereinafter) functions to read a digital audio signal recorded on a cassette tape and to reproduce it as an audio signal, and to read an analog signal recorded according to a conventional standard and reproduce it as it is. In other words, the DCC player has both a digital signal reproducing function and an analog signal reproducing function with advantages of digital recording (for example, improved performance and function of hardware), and advantages of analog recording (for example, the ability of using a large volume of existing software).

FIG. 4 is a block circuit diagram of a conventional portable DCC player to be used with a headphone speaker connected thereto.

The portable DCC player in FIG. 4 comprises a head unit 1, an analog signal reproducing circuit 2, a digital signal reproducing circuit 3, a switch 5, a drive circuit 6, a headphone jack 8 and the headphone speaker 9 to be connected to the player in use.

The head unit 1 includes a magnetic head 1a for reproducing a digital signal and a magnetic head 1b for reproducing an analog signal. The head 1a functions to read an audio signal which is usually 8 to 10 bits long and recorded in a digital manner on a cassette tape (not shown) and to output a digital audio signal D. The head 1b functions to read an audio signal recorded on a cassette tape according to the conventional standard and to output it as an analog audio signal H.

The analog signal reproducing circuit 2 includes an equalizer circuit composed of an amplifier 2a and a feedback circuit EQ, etc., for correction of signal distortion which may result from variations of magnetic characteristics of a recording medium. The analog signal reproducing circuit 2 receives the analog signal H from the head 1b, produces an analog reproduced signal I by correction of its distortion and outputs it to the switch 5.

The digital signal reproducing circuit 3 includes a digital signal processing circuit 3b responsive to the digital signal D from the head 1a for producing a digital signal E, a digital-to-analog (D/A) converter portion 3a for converting the digital audio signal D into an analog audio signal F and an attenuator 4 for attenuating the analog audio signal F to obtain an analog audio signal G. The digital signal processing circuit 3b operates to demodulate the digital signal D to obtain an original digital value prior to recording, to digitally process the signal to correct errors etc., and to produce the digital signal E. The D/A converter portion 3a converts the digital signal E into an analog signal, removes noise caused by quantization by means of a low-pass filter and produces the analog reproduced signal F. The attenuator 4 produces the reproduced signal G by attenuating the amplitude level of the reproduced signal F. The attenuation is necessary to make an amplitude level of the output signal G of the digital signal reproducing circuit 3 correspond with an amplitude level of an output signal I of the analog signal reproducing circuit and, hence, an amplitude level of an input signal J from such as a tuner.

Although the switch 5 is shown in this example as a slide type switch, a switch of any other type may be used so long as it can select either the signal G or I, together with another signal, such as J, and output the selected one, G or I, to the drive circuit 6 as a reproduced signal K.

The drive circuit 6 includes a power amplifier 6a which amplifies the signal K to obtain a signal M which is supplied through a coupling capacitor 6c to the headphone jack 8 as a drive signal N by which the headphone speaker 9 connected to the headphone jack 8 is driven.

The conventional DCC player including the analog signal reproducing circuit 2 and the digital signal reproducing circuit 3 as mentioned above reproduces an audio signal recorded in an analog manner on any existing tape by means of the analog signal reproducing circuit, and reproduces a digital audio signal of high tone quality by the digital signal reproducing circuit. Since one of these signals is selected by the switch 5, the signal supplied to the headphone speaker is either an analog-recorded or a digital-recorded audio signal.

The function of the attenuator 4 of the digital signal reproducing circuit 3 in such a conventional DCC player was described briefly. In order for a better understanding of the present invention, the function of the attenuator 4 will be described in more detail. The amplitude level of the digital signal F obtained from a recorded audio signal having the usual level is usually higher than that of the analog signal I by about 17 dB and, therefore, the signal F is attenuated correspondingly so that either of the both signals to be supplied selectively to the headphone speaker has substantially the same signal level. With this scheme, the circuit portion following the drive circuit 6 can be used commonly by these signals, making the circuit construction compact.

It is clear that, by attenuating the signal F by about 17 dB, a portion of the signal F may be lost. That is, such a partial loss of signal causes the S/N ratio thereof to be degraded, which makes the high tone quality of audio signal reproduced from digital-recorded signal nonsense, and it is impossible to effectively utilize the merit of the digital recording system since a compact construction has a higher priority in a portable DCC player.

SUMMARY OF THE INVENTION

An object of the present invention is to provide a DCC player in which the tone quality of a reproduced signal obtainable from an audio signal recorded in digital manner is not degraded while achieving compactness of the player.

Another object of the present invention is to provide a portable DCC player in which the tone quality of a reproduced signal obtainable from an audio signal recorded in a digital manner is not degraded while achieving compactness of the player.

A further object of the present invention is to provide a compact DCC player which includes an audio circuit having a digital reproducing system and an analog reproducing system, and in which an audio signal can be amplified without degrading the S/N ratio of the digital reproducing system.

In a DCC player according to the present invention, amplification of a power amplifier is set correspondingly to an amplitude level of an audio signal from an analog signal reproducing system and, when a digital signal reproducing system is selected, an output thereof is input to the power amplifier without attenuation. The power amplifier has a negative feedback circuit. An amount of feedback, when a digital signal reproducing system is selected, is increased to reduce the amplification thereof to thereby match an output level of the power amplifier with an output level of the analog signal reproducing system so that the S/N ratio thereof is improved. Thus, the tone quality of the digital audio signal is maintained high. In this case, an input stage of the power amplifier or an input stage of a pre-amplifier may be constructed with a differential amplifier, etc., having a dynamic range sufficient to avoid distortion of an input signal from the digital reproducing system when it is directly supplied thereto.

In detail, the DCC player according to the present invention comprises an analog-recorded signal reproducing circuit, a digital-recorded signal reproducing circuit, a switch circuit and a drive circuit. The analog-recorded signal reproducing circuit amplifies an analog-recorded audio signal reproduced from a cassette tape, equalizes it and outputs it as a first reproduced audio signal. The digital-recorded signal reproducing circuit demodulates a modulated digital-recorded audio signal reproduced from a cassette tape, digital-to-analog converts it, removes noise components thereof, by a filter components thereof, and outputs it as a second reproduced audio signal. The switch circuit includes a switch for selecting either the first or second reproduced audio signal and a circuit ganged with the switch for outputting it as a selected signal together with a selection signal indicative of the selection. The drive circuit includes a power amplifier which is responsive to the selected signal and the selection signal for amplifying the selected signal to obtain a drive signal. The gain or amplification factor of the power amplifier is variable so that the drive signal has the same amplitude regardless of whether the selected signal is the first reproduced signal or the second reproduced signal whose amplitude is usually larger than that of the first reproduced signal since it is not subjected to attenuation. A loudspeaker is driven by this drive signal to produce an audio signal.

In another example of the present invention, the amplifier included in the analog-recorded signal reproducing circuit, the power amplifier included in the drive circuit and semiconductor elements constituting the filter included in the digital-recorded signal reproducing circuit are integrated in a single IC chip.

In the DCC player constructed as mentioned above according to the present invention, since, when the first reproduced signal supplied from the analog-recorded signal reproducing circuit which is similar in construction and operation to a conventional circuit is selected by the switch circuit, the drive circuit amplifies it with an amplification factor similar to that of the conventional circuit and outputs it as the drive signal. Therefore, it is compatible with the conventional analog audio signal reproducing device.

On the other hand, when the second reproduced signal which is not subjected to attenuation (contrary to that shown in FIG. 4) is selected by the switch circuit, the power amplifier included in the drive circuit amplifies it with an amplification factor smaller than that for the first reproduced signal, so that the output level of the drive circuit is always substantially constant. In addition thereto, the second reproduced signal can be output with the high tone quality inherent to the digital recording system.

As a result, the effect of co-existence of the analog recording system on the digital recording system is excluded, while the high performance of the digital recording system is maintained.

DESCRIPTION OF THE PREFERRED EMBODIMENTS

Figure 1:
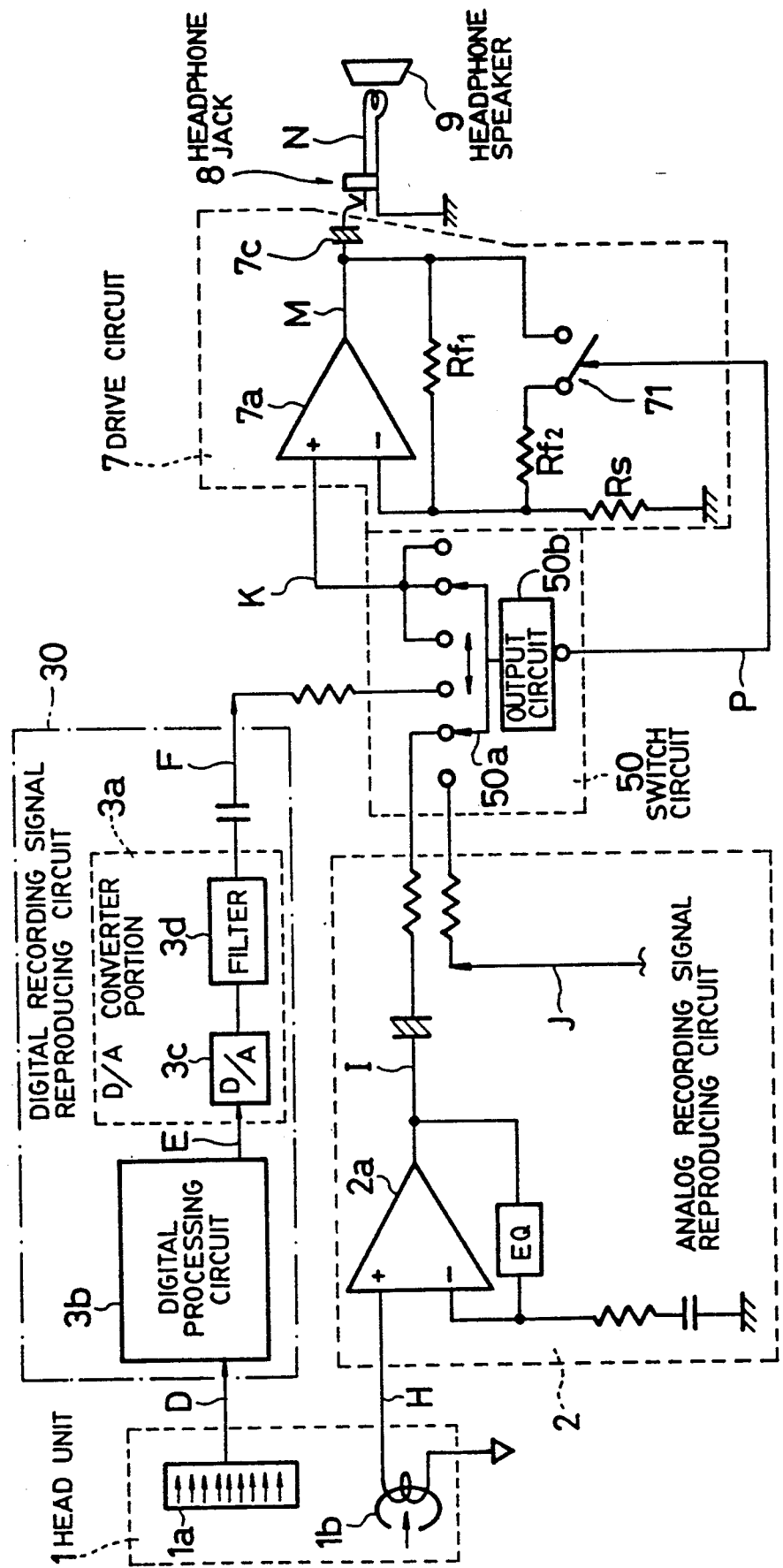
FIG. 1 is a block circuit diagram showing a portable DCC player according to an embodiment of the present invention.
Figure 4:
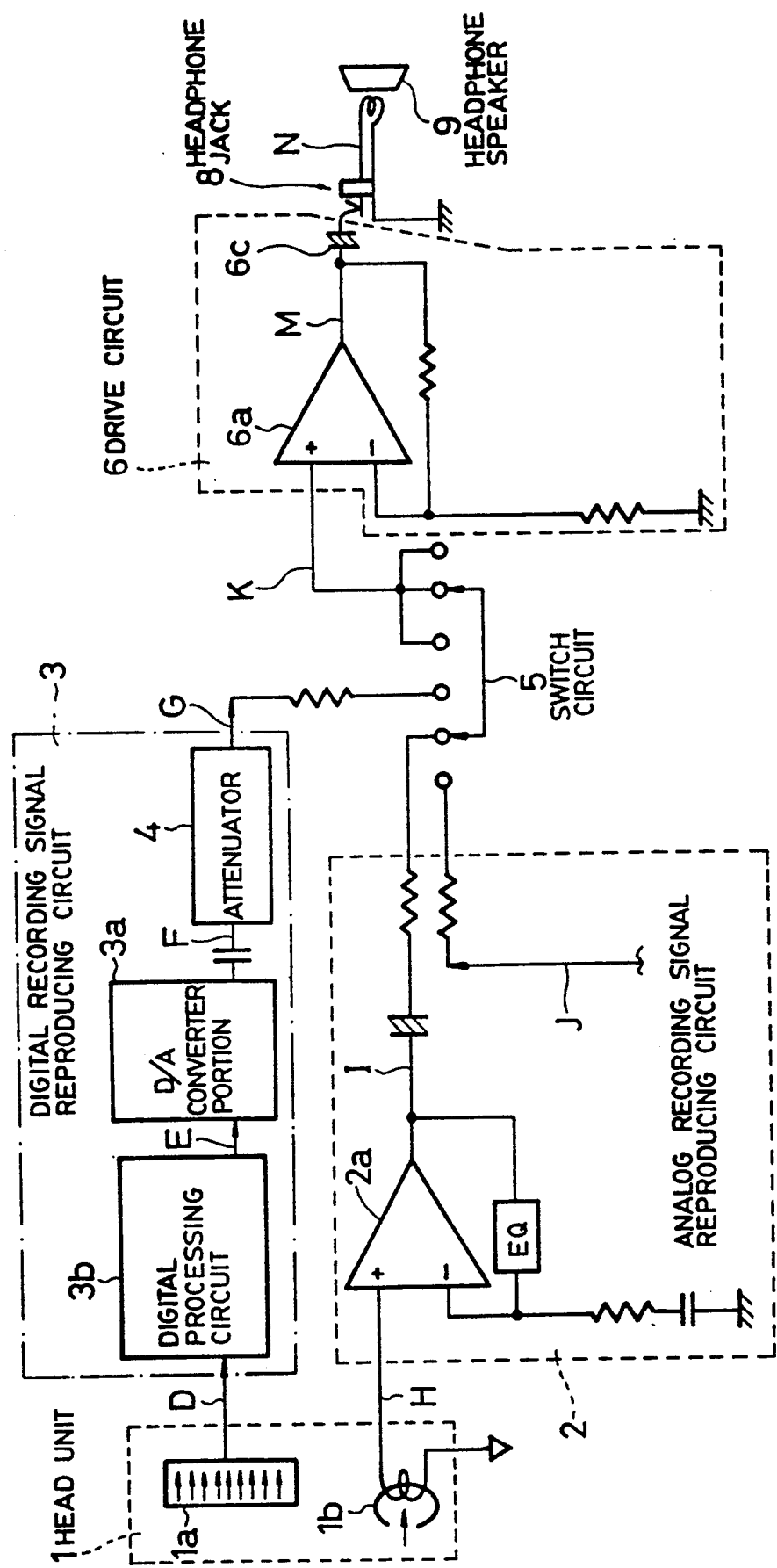
FIG. 4 is a block circuit diagram of a conventional portable DCC player.

Differences between the DCC player shown in FIG. 1 and that shown in FIG. 4 lie in that the switch 5 in FIG. 4 is replaced by a switch circuit 50, and in that the drive circuit 6 in FIG. 4 is replaced by a drive circuit 7. Further, the digital-recorded signal reproducing circuit 3 in FIG. 4 is replaced by a digital-recorded signal reproducing circuit 30, and the attenuator 4 in FIG. 4 is removed. Other components in FIG. 1 than those mentioned above are similar to those are designated in FIG. 4 and shown by the same reference numerals, respectively: details thereof are thus omitted in the following description.

In FIG. 1, a D/A converter portion 3a of a digital-recorded signal reproducing circuit 30 converts a digital signal E from a digital processing circuit 3b into an analog signal. Noise caused by quantization thereof is removed by a low-pass filter 3d, resulting in an analog reproduced signal F. Since there is no attenuator for making an amplitude level of the FIG. 4 output signal G of the digital signal reproducing circuit 3 correspondent with an amplitude level of an output signal I of the analog signal reproducing circuit, the reproduced signal F is output directly or through a coupling circuit to the switch circuit 50. Such a coupling circuit may include capacitor(s), fixed resistor(s) and/or variable resistor(s) and may have protection and/or regulation functions as well.

Similarly, an analog-recorded signal reproducing circuit 2 is output to the switch circuit 50 as an analog reproduced signal I. The output signal I may also be supplied directly or through a coupling and/or protecting circuit including capacitors and/or resistors to the switch circuit 50.

The switch circuit 50 comprises, for example, a slide switch 50a and an output circuit 50b ganged with the switch 50a for outputting a switch signal P for switching amplification factor of an amplifier provided in a succeeding stage. The switch circuit 50 receives the reproduced signals F and I and another input signal, for example, J. Either of the reproduced signals F and I is selected by the switch 50a, which is output by the switch circuit 50 as a reproduced signal K. The output circuit 50b responds to the operation of the switch 50a and produces a switch signal P which takes in, for example, the high level when the switch 50a selects the reproduced signal F, and the low level when the switch 50a selects the reproduced signal I.

The drive circuit 7 comprises a switch circuit 71 and a power amplifier 7a composed of an operational amplifier having an input stage composed of a differential amplifier. The amplifier 7a amplifies the reproduced signal K to provide a signal M which is supplied through a coupling capacitor 7c to a headphone jack 8 as a drive signal N. A headphone speaker 9 is connected to the headphone jack 8.

As mentioned previously, for a recorded signal having a usual level, an amplitude of the reproduced signal K supplied from the switch circuit 50 to the power amplifier 7a, when the reproduced signal F is selected, is larger by 17 dB than that when the reproduced signal I is selected. Assuming that the amplification of the power amplifier 7a is set to a value suitable for the reproduced signal I and that the reproduced signal F is amplified thereby, the output becomes unbalanced, and must be regulated. If the power amplifier is not capable of amplifying such a signal F, the output thereof may be distorted.

In the present invention, since the initial stage of the power amplifier 7a comprises the differential amplifier whose input impedance is high and thus has a large dynamic range, there is substantially no such distortion in the initial stage even if there is a difference of 17 dB in the input signal thereof. That is, the power amplifier 7a should be designed to have such an initial stage having such characteristics.

In order to avoid the problem caused by the difference in input signal level between the signals F and I, the amplification of the power amplifier 7a is made variable by changing the amount of negative feedback thereof. The negative feedback circuit of the power amplifier 7a comprises a resistor Rf1, a resistor Rf2 and a switch 71 connected in series with the resistor Rf2. The switch 71 selectively connects the resistor Rf2 in parallel to the resistor Rf1 according to the switch signal P of the output circuit 50b of the switch circuit 50.

In this example, the switch signal P is high when the reproduced signal F is selected by the switch 50a as the signal K, and low when the reproduced signal I is selected. The switch 71 is in off state when the switch signal P is low, providing the feedback determined by the resistor Rf1 alone so that the signal I, as the signal K, is amplified with the original amplification of the power amplifier 7a. On the other hand, the switch 71 is turned on in response to the high level signal P to connect the feedback resistor Rf2 in parallel to the resistor Rf1 to thereby increase the feedback amount and hence to reduce amplification by 17 dB compared with that provided by the resistor Rf1 alone. Therefore, the signal F is amplified, as the signal K, with the reduced amplification. Since the regulation of amplification of the power amplifier 7a is performed by regulation of the feedback amount thereof, the S/N ratio with respect to the signal F for the digital signal reproducing system is further improved.

Thus, there is substantially no difference the output levels of the power amplifier 7a between the signals F and I, with the result the drive signal has substantially the same level regardless of which signal is selected, analog or digital. In such a portable player, sound volume may be regulated by a variable resistor provided on an output side of the drive circuit. However, it is possible to regulate sound volume by providing a variable resistor before the power amplifier 7a.

Figure 2:
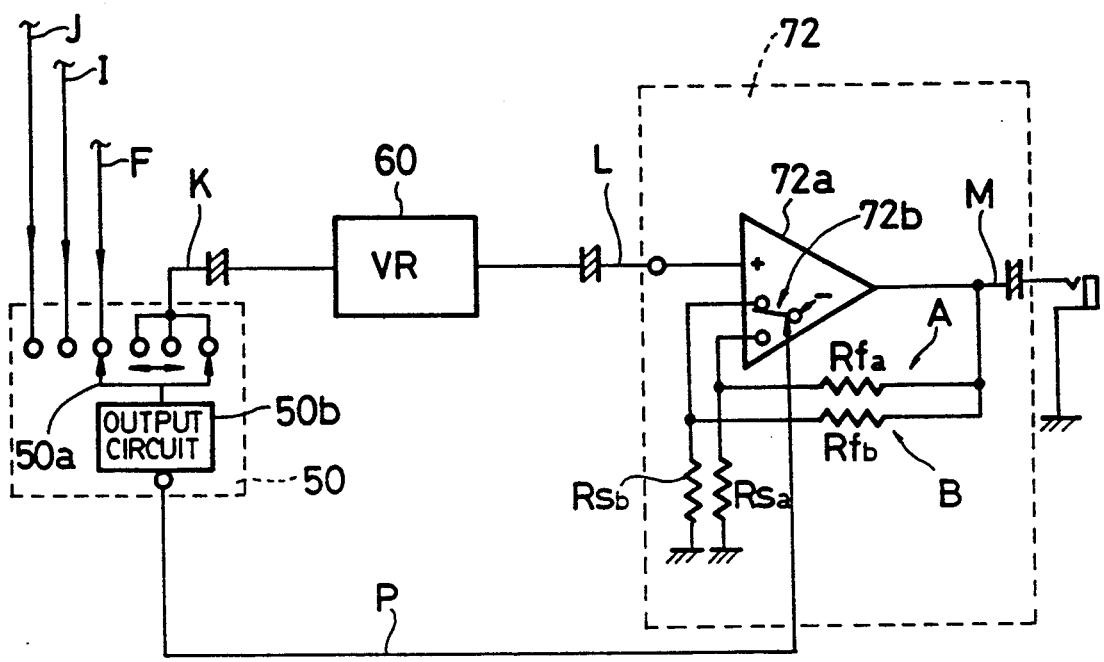
FIG. 2 is a circuit diagram of a portion of the embodiment shown in FIG. 1 showing another embodiment of the present invention.

FIG. 2 shows another embodiment of the present invention in which a feedback amount of a power amplifier of a drive circuit is varied by another circuit construction.

In FIG. 2, a variable resistor VR 60 is inserted between a signal output of a switch circuit 50 which is similar to the switch circuit 50 in FIG. 1, and a signal input of the power amplifier 72a of the drive circuit 72. In this embodiment, the variable resistor VR 60 is adapted to regulate an output sound volume of a speaker by changing an amplitude level of a reproduced signal K to obtain a signal L which is amplified by the power amplifier 72 and supplied to the speaker as a drive signal M.

The drive circuit 72 includes, in addition to the power amplifier 72a, which is an operational amplifier, a switch circuit 72b constituted with transistors, for switching amplification of the power amplifier 72a according to a switch signal P from an output circuit 50a of the switch circuit 50. In this example, the switch circuit 72b has an output connected to an inverted input terminal of a differential amplifier in an input stage of the power amplifier 72a. A pair of feedback circuits A and B are provided, either one of which is connected selectively to the power amplifier 72a by the switch 72b. The feedback circuit A comprises a feedback resistor Rfa connected between an output of the power amplifier 72a and one input of the switch circuit 72b, and a reference resistor Rsa connected between the one input of the switch circuit 72b and ground. The feedback circuit B comprises a feedback resistor Rfb connected between the other input of the switch 72b and the output of the power amplifier 72a, and a reference resistor Rsb connected between the other input of the switch 72b and ground.

For example, when the reproduced signal I is selected as the signal K, the feedback circuit A is selected to set amplification of the power amplifier 72a to a high value and, when the signal F is selected, the feedback circuit B is selected to set amplification of the power amplifier 72b to a lower value, providing a suitable output for either of the signals I and F.

In this embodiment, the drive circuit 72 becomes easily integrated and therefore is effective in making the device compact.

In a signal path between the output of the switch circuit 50 and the drive circuit 72 (or 7 in FIG. 1), a pre-amplifier, a graphic equalizer and/or a very low frequency signal emphasizer, etc., may be provided in addition to the variable resistor VR 60. The variable resistor VR 60 may be replaced by an electronic volume circuit. Such a pre-amplifier may be provided in lieu of the variable resistor VR 60. With such a pre-amplifiers provided in addition to the variable resistor VR 60 or as a replacement therefor, when its input stage comprises a differential amplifier having a large dynamic range, the input stage of the power amplifier may have any circuit construction.

Figure 3:
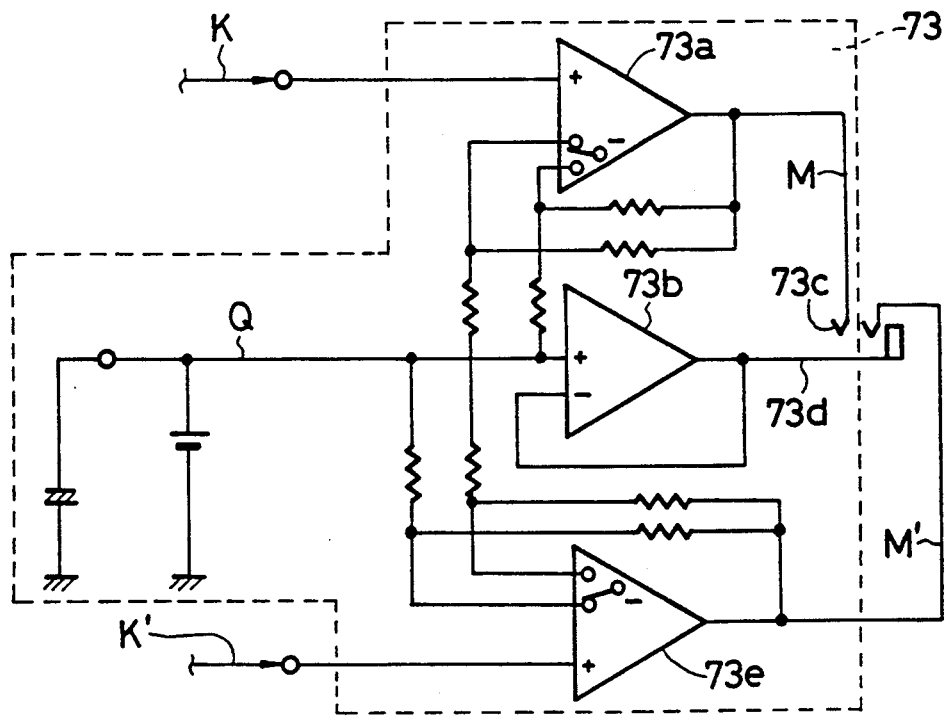
FIG. 3 is a circuit diagram of a portion of the embodiment shown in FIG. 1 showing a further embodiment of the present invention.

FIG. 3 shows another embodiment of a drive circuit, which is suitable for a stereo system. The drive circuit 73 shown in FIG. 3 comprises a pair of power amplifiers 73a and 73e for amplifying right and left demodulated stereo signals K and K' to provide drive signals M and M' for a headphone set at headphone jack 73c respectively.

The drive circuit 73 further comprises an amplifier 73b which is adapted to amplify a constant voltage Q and supply the amplified voltage on a feedback line 73d as a feedback signal. Thus, the constant voltage output of the amplifier 73b provides an operating point for the drive signals M and M'; causing the coupling capacitor used in the drive circuit shown in FIG. 1 or 2 to be unnecessary. As shown, the amplifier 73b for providing the operating point voltage is shared by the amplifiers 73a and 73e. It should be noted that the amplifier 73b is also operable when the system operates in monaural mode.

Although not shown, the amplifier 2a of the analog recorded signal reproducing circuit 2 and the amplifier 7a (or 72a, 73a or 73b) of the drive circuit 7 (or 72 or 73), or the semiconductor elements of the filter 3d of the digital recorded signal reproducing circuit 30 in addition thereto can be integrated in a single IC chip. Therefore, it is possible to make the device compact.

The speaker in any of the described embodiments is not limited to a headphone speaker, as a matter of course. Further, by integrating, in a single IC chip, the amplifier of the analog-recorded signal reproducing circuit as an equalizer, the power amplifier of the drive circuit and the semiconductor elements constituting the filter of the digital recorded signal reproducing circuit, it is possible to realize a compact device suitable for a portable DCC.

What is claimed is:

1. A digital cassette tape reproducing device comprising:

an analog-recorded signal reproducing circuit responsive to an analog-recorded signal read out from a cassette tape to obtain a first reproduced audio signal;

a digital-recorded signal reproducing circuit responsive to a digital-recorded signal read out from a cassette tape for demodulating the digital-recorded signal to an original digital recording value, and for digital-to-analog converting the original digital recording value to obtain a second reproduced audio signal;

a switch circuit for selecting either of said first or second reproduced audio signal and for providing a selection signal indicative of the selected audio signal; and a drive circuit having an amplifier including a negative feedback circuit, said drive circuit being responsive to either of said first or second audio reproduce signal for producing a drive signal for a speaker, an amount of negative feedback being increased to reduce an amplification of said amplifier when said selection signal from said switch circuit indicates that said second reproduced audio signal is selected so that said second reproduced audio signal is amplified without distortion.

2. The digital cassette tape reproducing device claimed in claim 1, wherein said amplifier of said drive circuit comprises a power amplifier having a differential amplifier in an input stage thereof.

3. The digital cassette tape reproducing device claimed in claim 2, wherein the amplification of said drive circuit amplifier is reduced such that a difference in amplitude level between said first and second reproduced audio signals is substantially canceled out.

4. The digital cassette tape reproducing device claimed in claim 3, wherein said selection signal is a switch signal for switching the amplification of said power amplifier, and wherein said power amplifier comprises an operational amplifier.

5. The digital cassette tape reproducing device claimed in claim 4, further comprising a variable resistor provided between said operational amplifier and said switch circuit for regulation of sound volume.

6. The digital cassette tape reproducing device claimed in claim 4, further comprising a pre-amplifier provided between said operational amplifier and said switch circuit.

7. The digital cassette tape reproducing device claimed in claim 1, wherein said selection signal is a switch signal for switching the amplification of said amplifier, and wherein said drive circuit comprises a first amplifier responsive to either of said first or second reproduced audio signal and said selection signal for amplifying either of said reproduced audio signals with an amplification corresponding to said selection signal to provide said drive signal, and a second amplifier for amplifying a constant biasing voltage to provide a constant operating point voltage on a feedback signal line of said drive signal.

8. The digital cassette tape reproducing device claimed in claim 1, wherein said analog-recorded signal reproducing circuit includes an equalizing amplifier and wherein said equalizing amplifier and said amplifier of said drive circuit are integrated in a single IC chip.

9. The digital cassette tape reproducing device claimed in claim 1, wherein said analog-recorded signal reproducing circuit includes an equalizing amplifier and wherein said equalizing amplifier, said amplifier of said drive circuit and semiconductor elements of a filter of said digital-recorded signal reproducing circuit are integrated in a single IC chip.

* * * * *